United States Patent
Dressler et al.

(10) Patent No.: US 8,171,341 B2
(45) Date of Patent: *May 1, 2012

(54) METHOD FOR CONTROLLING AN OPERATING MECHANISM AND A MANIPULATION UNIT

(75) Inventors: Marc Dressler, Horn (DE); Daniel Hofmann, Paderborn (DE); Bastian Kellers, Paderborn (DE); Thorsten Hufnagel, Paderborn (DE)

(73) Assignee: dSpace digital signal processing and control engineering GmbH, Paderhorn (DE)

( * ) Notice: Subject to any disclaimer, the term of this patent is extended or adjusted under 35 U.S.C. 154(b) by 105 days.

This patent is subject to a terminal disclaimer.

(21) Appl. No.: 12/695,719

(22) Filed: Jan. 28, 2010

(65) Prior Publication Data

US 2010/0192016 A1 Jul. 29, 2010

Related U.S. Application Data

(63) Continuation-in-part of application No. 12/475,934, filed on Jun. 1, 2009.

(30) Foreign Application Priority Data

Jan. 28, 2009 (DE) .......................... 10 2009 006 517

(51) Int. Cl.
 *G06F 11/00* (2006.01)
(52) U.S. Cl. .............................. 714/30; 714/45; 714/39
(58) Field of Classification Search ..................... 714/30
 See application file for complete search history.

(56) References Cited

U.S. PATENT DOCUMENTS

| | | | | |
|---|---|---|---|---|
| 5,490,064 A | * | 2/1996 | Minowa et al. | 701/1 |
| 5,638,272 A | * | 6/1997 | Minowa et al. | 701/1 |
| 5,794,165 A | * | 8/1998 | Minowa et al. | 701/1 |
| 5,968,100 A | * | 10/1999 | Kayano et al. | 701/1 |
| 5,978,937 A | * | 11/1999 | Miyamori et al. | 714/45 |

(Continued)

FOREIGN PATENT DOCUMENTS

DE 19536490 A1 4/1997

(Continued)

OTHER PUBLICATIONS

Office Action for German Application Serial No. 2009 006 517.2-53; mailed on Dec. 22, 2009.

(Continued)

*Primary Examiner* — Scott Baderman
*Assistant Examiner* — Kamini Patel
(74) *Attorney, Agent, or Firm* — Orrick, Herrington & Sutcliffe LLP

(57) ABSTRACT

A method for controlling an operating mechanism using a manipulation unit, in which the operating mechanism includes at least one microcontroller, at least one memory with a plurality of memory cells, and at least one debug interface, and the debug interface presents a monitoring functionality for monitoring memory content and using the debug interface a first timepoint of the operating mechanism is detected for writing into a first memory cell and, using the information transmitted by the debug interface for the first timepoint to the manipulation unit, a trigger timepoint results for a processing routine through the manipulation unit (IN) and using the processing routine a second value is written by the manipulation unit using the debug interface for a second timepoint in the first memory cell before the first memory cell is read by the operating mechanism for a third timepoint.

23 Claims, 3 Drawing Sheets

U.S. PATENT DOCUMENTS

| | | | |
|---|---|---|---|
| 6,009,370 A * | 12/1999 | Minowa et al. | 701/102 |
| 7,089,097 B2 | 8/2006 | Sakurai et al. | |
| 2002/0144235 A1 | 10/2002 | Simmers et al. | |
| 2003/0051192 A1 | 3/2003 | Pillay et al. | |
| 2004/0249986 A1 * | 12/2004 | Minowa et al. | 710/1 |
| 2005/0071594 A1 * | 3/2005 | Jarabek et al. | 711/167 |
| 2006/0206241 A1 * | 9/2006 | Minowa et al. | 701/1 |
| 2008/0162900 A1 | 7/2008 | Rolfsmeier et al. | |

FOREIGN PATENT DOCUMENTS

| | | |
|---|---|---|
| DE | 10303490 A1 | 8/2004 |
| DE | 60019750T2 B1 | 9/2005 |
| DE | 10 2004 027 033 A1 | 10/2005 |
| DE | 102004027033 A1 | 10/2005 |
| DE | 10 2004 041 523 A1 | 3/2006 |
| DE | 10 2006002354 A1 | 7/2007 |
| DE | 102006002354 A1 | 7/2007 |
| DE | 10 2006 062 555 A1 | 7/2008 |
| DE | 102007017865 A1 | 11/2008 |
| DE | 10 2009 056 758 A1 | 7/2010 |
| WO | WO 00/43885 A1 | 7/2000 |
| WO | WO 2005/041041 A2 | 5/2005 |
| WO | WO 2005/045538 A1 | 5/2005 |

OTHER PUBLICATIONS

Germany Search Report 10 2009 652.0, Sep. 30, 2010 with machine English translation thereof.

Debugger, Wikipedia http://de.wikipedia.org/w/index.php?title=Debugger&oldid=67287633, Aug. 24, 2010 with English translation thereof.

Germany Search Report 10 2009 0560758.5, Apr. 28, 2010 and partial English translation thereof.

Calibration and Bypassing Hardware, Catalog 2008, dSpace, Technologiepark 25, 33100 Paderborn, Germany, info@dspace de, www.dspace.com, pp. 472-488.

Function Prototyping, dSpace Prototyping Systems, Catalog 2008, dSpace, Technologiepark 25, 33100 Paderborn, Germany, info@dspace de, www.dspace.com, pp. 46-53.

U.S. Appl. No. 12/695,813 Office Action dated Jul. 6, 2011.

* cited by examiner

METHOD FOR CONTROLLING AN OPERATING MECHANISM AND A MANIPULATION UNIT

CROSS REFERENCE TO RELATED APPLICATIONS

This application claims priority to and is a continuation-in-part of U.S. patent application Ser. No. 12/475,934 filed Jun. 1, 2009, that claims priority to German Application No. DE 102009006517.2 filed Jan. 28, 2009 that are incorporated by reference as though fully set forth herein.

FIELD

The present invention relates generally to control systems. In particular, the present method is directed to controlling an operating mechanism and a manipulation unit.

BACKGROUND

Operating mechanisms are used in large numbers in many fields of engineering. An especially important area of use is, among other things, engine control in an automobile and controlling engines in aircraft.

One method of controlling an operating mechanism is known from DE 10 2004 027 033 A1. Here, a control device in application of an operating mechanism/debug interface and a memory built into the control device, stores data from the operating mechanism in the memory of the control device and upon using the operating mechanism/debug interface further, data are also reflected back into the memory of the operating mechanism. In one embodiment, the data are received in the control device of a coordinating unit and provided for a temporal arrangement using a time stamp. Furthermore, the coordinating unit has connections available for internal and external triggering signals by which it is possible to activate corresponding subunits in the control device and in particular to start a bypass routine.

Also from DE 10 2006 062 555 A1, a method is known for monitoring an operating mechanism, in which a control device for monitoring an operating mechanism includes at least one microcontroller, at least one memory, and at least one debug interface. With the debug interface, the so-called trace functionality exhibits that it is possible to monitor the addresses to be observed.

From the previous method, it appears that manipulation of the operating mechanism functions is time-intensive and is often performed using a so-called external bypass routine. Here, in executing the program, an interrupt processing is solicited with an external manipulation device using the operating mechanism's program of permanently pre-set service calls by the operating mechanism using externally defined trigger pulses. Within the framework of the interrupt processing, the values additionally needed for calculation are sent to the manipulation device. After calculation in the manipulation device, the altered quantities are sent back to the operating mechanism. While the service calls are permanently linked in the program code of the operating mechanism, a subsequent change in service-call points is very expensive and can only be performed by each operating-mechanism manufacturer at great expense, because, for example, the operating-mechanism program already existing has to be transmitted again. Furthermore, using the service-call points, the size of the memory needed is increased and the processing speed of the operating-mechanism program is affected detrimentally.

SUMMARY

A method for controlling an operating mechanism using a manipulation unit, in which the operating mechanism includes at least one microcontroller, at least one memory with a plurality of memory cells, and at least one debug interface, and the debug interface presents a monitoring functionality for monitoring memory content and using the debug interface a first timepoint of the operating mechanism is detected for writing into a first memory cell and, using the information transmitted by the debug interface for the first timepoint to the manipulation unit, a trigger timepoint results for a processing routine through the manipulation unit (IN) and using the processing routine a second value is written by the manipulation unit using the debug interface for a second timepoint in the first memory cell before the first memory cell is read by the operating mechanism for a third timepoint.

BRIEF DESCRIPTION OF THE DRAWINGS

The method according to the invention will be explained next using the embodiment examples in connection with the schematic drawings. Identical functions in the drawing data are referred to by the same reference designations.

DETAILED DESCRIPTION

Figure 1:
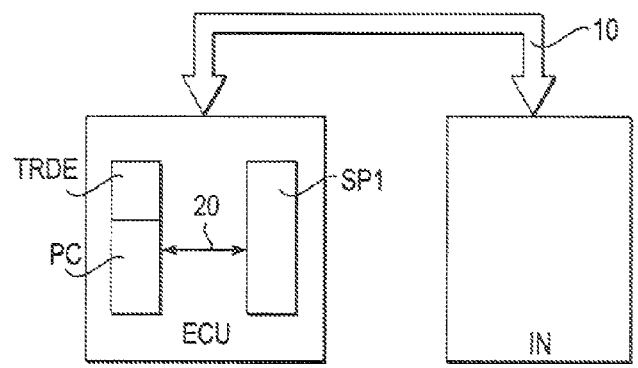
FIG. 1 a schematic representation of a manipulation unit connected to an operating mechanism, according to one embodiment.

A method for controlling an operating mechanism using a manipulation unit, in which the operating mechanism includes at least one microcontroller, at least one memory with a plurality of memory cells, and at least one debug interface, and the debug interface exhibits a monitoring functionality for monitoring memory content and using the debug interface, a first timepoint for the operating mechanism is detected for writing a first value into a first memory cell of the first memory and, using the information transmitted by the debug interface for the first timepoint to the manipulation unit, a trigger timepoint results for a processing routine through the manipulation unit, and from the manipulation unit using a processing routine a second value is written using the debug interface to a second timepoint in the first memory cell in the first memory before the first memory cell of the first memory is read by the operating mechanism for a third timepoint.

According to a second embodiment, a manipulation unit controls an operating mechanism, in which the operating mechanism exhibits at least one microcontroller, at least one memory with a plurality of memory cells, and at least one debug interface. Moreover, the debug interface presents a monitoring functionality for monitoring memory content and is set up to detect a first timepoint written to a first memory cell of the first memory and to transmit the associated first value to the manipulation unit, and the manipulation unit is set up to let a processing routine run using the timepoint transmitted and to determine a second value using the processing routine and using the debug interface set up to write the second value for a second timepoint into the first memory cell of the first memory before the first memory cell of the first memory is read by the operating mechanism.

Using the manipulation unit, the writing of the values into the memory cells of the operating mechanism can be detected independent of the service calls to arbitrary program points and arbitrary timepoints, and subsequently the values in the respective memory cells can be altered. Thus, the method is flexible and can, particularly, especially without knowing the respective source codes of the operating-mechanism program, be used for a great number of operating mechanisms from different manufacturers. Furthermore, no adjustments to the operating-mechanism program are needed. Because the corresponding service calls with the associated parts of the program are not necessary with the operating mechanism's program, a detrimental effect on program execution and memory consumption can be avoided.

In one embodiment, the manipulation unit tests and monitors whether the second timepoint lies ahead of the third timepoint or behind it and whether a pre-set value is issued, depending on the test result. It is hereby possible to detect the result of an effect, that is, a timely overwrite of memory cells, and to communicate to the user. The monitoring and the task using a service program, which is implemented in the manipulation unit, are performed in an advantageous manner.

In a further embodiment, the time period needed by the operating mechanism to write the first value into the first memory cell of the first memory and to read the first memory cell in the first memory is determined. According to one development, determining the time period for read-write access to a specific memory cell is done by analysis of the program code for the operating mechanism. Here, for instance, a program code executed by a microcontroller trace in the operating mechanism is analyzed. The analysis of the program code is done without using the operating mechanism, in which the analysis is done on an external device, in particular a PC. Determining the relevant timepoints preferably occurs by using a sequential evaluation of the respective command set for the so-called instruction code. With the help of a typical execution time for each command, which can be determined on the basis of processor type and timing frequency used, the minimum time period between each read-write access is extracted. An advantage of this embodiment is that determining the time period can also be done in advance, independently of the execution of the operating-mechanism program under actual conditions, such as is given, for example, for an internal condition in a vehicle. Herewith, the risk of error functions as a result of an erroneous overwrite can be reduced, in which the time periods of all occurring read-write accesses are tested and checked as to the extent to which the execution time of the manipulation unit is sufficient to overwrite the respective values from the manipulation unit into the memory cells concerned. Provided that the operating mechanism is not installed, a check can also be done using a virtual test environment or by a simulator, that is, data comparable to actual conditions are made available to the operating mechanism at its interface.

According to another embodiment, the time period needed by the operating mechanism is determined by the manipulation unit using the monitoring functionality of the debug interface. In another embodiment, determining the timepoints can be done quasi-online, that is, in the actual operation of the operating mechanism, and then it can be decided, during the operation of the operating mechanism in real time, which memory cell of the first memory is to be written to with a second value by the manipulation unit.

In a further embodiment, the controllable memory cells of the operating mechanism can be distributed by the manipulation unit using a service program, using the size of the time interval for read-write access occurring in the operating mechanism. Thus, the user gets the opportunity to define, preferably in advance, memory cells which are deliberately defined in entirety, that is, those suitable for control.

In another embodiment, the second value for a fourth timepoint is written into a first memory cell of a second memory and the second value is read by the manipulation unit using the processing routine out of the first memory cell of the second memory. The second memory exhibits a plurality of memory cells and can be set up in both the operating mechanism and the manipulation unit. Furthermore, the first memory cell of the second memory is written using a remote control device. In order to ensure that the second value is written into the first memory before the first memory cell of the first memory is read by the operating mechanism for a third timepoint, the fourth timepoint is ahead of the second timepoint. Herewith the second value of the manipulation routine is made available before the timepoint at which the second value is written using the manipulation routine into the first memory cell of the first memory.

For an especially time-critical task to be executed in the operating mechanism, the second value is made available in the first memory cell of the second memory for a fourth timepoint, in which the fourth timepoint is ahead of the first timepoint. A delay can thereby be avoided in processing commands, because even before the first write in the first memory cell of the first memory, the second value is already available for a subsequent overwrite of the first value.

According to another embodiment, the second value is written, using a remote control device, that is, using a so-called RCP device, in the first memory cell of the second memory. Particularly if the complexity of the manipulation unit is kept low, expensive calculations and input can preferably be dealt with by using a very calculation-robust remote control device. Hereby, the second memory can be constructed in both the manipulation unit and in the remote control device. In the first alternative, the second memory is written to, using the remote control device.

According to the illustration in FIG. 1, a manipulation unit IN is hooked up using a data line 10 to an operating mechanism ECU. Furthermore, the operating mechanism ECU has a microcontroller PC with a debug interface TRDE which involves a monitoring functionality (trace functionality). The microcontroller PC and the debug interface TRDE, which is executed as an integral component of the microcontroller, are connected using a data line 20 to a memory SP1. The memory is executed as a component of the microcontroller. Inside the manipulation unit IN, different service programs and in particular a processing routine (not depicted) are generally implemented.

Figure 2:
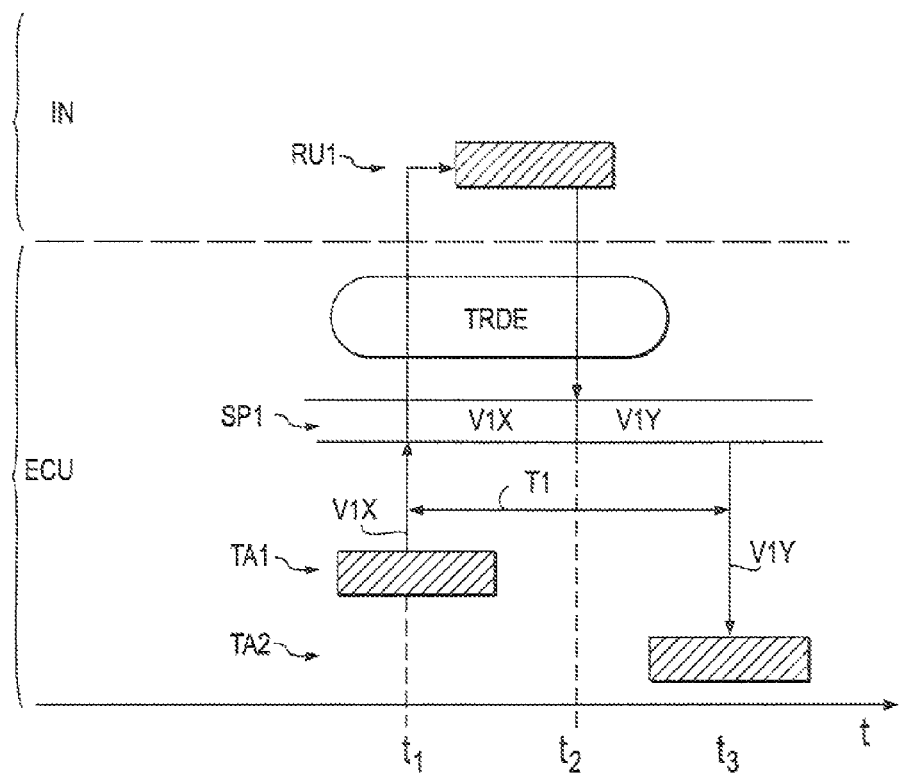
FIG. 2 a schematic representation of a time sequence for a change in data within the operating mechanism of the manipulation unit, according to one embodiment.

In the illustration in FIG. 2, a detailed time sequence is depicted for memory-cell control using the collaboration of the manipulation unit IN with the debug interface TRDE of the operating mechanism ECU from FIG. 1. Here, the time sequence is illustrated by a time axis t for the step depicted. A first task TA1 is executed in the operating mechanism ECU using the operating-mechanism program and, within the framework of executing the first task TA1, a first value V1X is written for a first timepoint t1 into a first memory cell of the memory SP1. The fact of writing the first value V1X to a first timepoint t1 is transmitted, together with the value V1X, to the manipulation unit IN using the debug interface TRDE. In the manipulation device IN, the information transmitted defines a trigger timepoint using which a processing routine RU1 is started and finished. A second value V1Y is written by the manipulation unit IN, using the processing routine RU1 and using the debug interface TRDE, to a second timepoint t2 in the memory cell of the first memory SP1 before the first memory cell is read by the operating mechanism ECU while the execution of a second task TA2 is read for a third timepoint t3.

Figure 3:
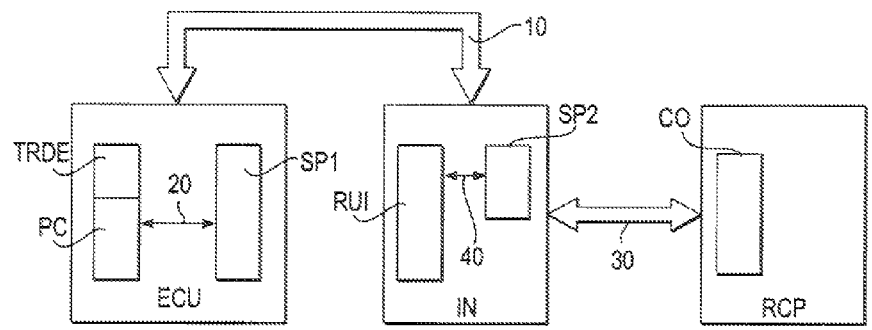
FIG. 3 a schematic representation of manipulation unit connected to an operating mechanism with a remote control unit attached, according to one embodiment.

In the illustration in FIG. 3, a remote control device RCP is constructed in addition to the manipulation unit IN previously mentioned from FIG. 1. In the following, only the differences are presented for the arrangements explained in connection with the drawing data in FIG. 1. The remote control device RCP is hooked up using a data link 30 to the manipulation unit IN. In the manipulation unit IN, the processing routine RU1 is depicted as a box. The processing routine RU1 is connected to a second memory SP2 with a plurality of memory cells by using line 40. Furthermore, the remote control device RCP exhibits a control routine CO, which is also drawn as a box.

Using the control routine CO and using the manipulation unit IN, a second value V1Y is written into the first memory cell of the second memory SP2. The second value V1Y can be subsequently read out using the processing routine RU1 through the line 40 from the second memory SP2 and filed over the data line 10 in the first memory SP1.

Figure 4:
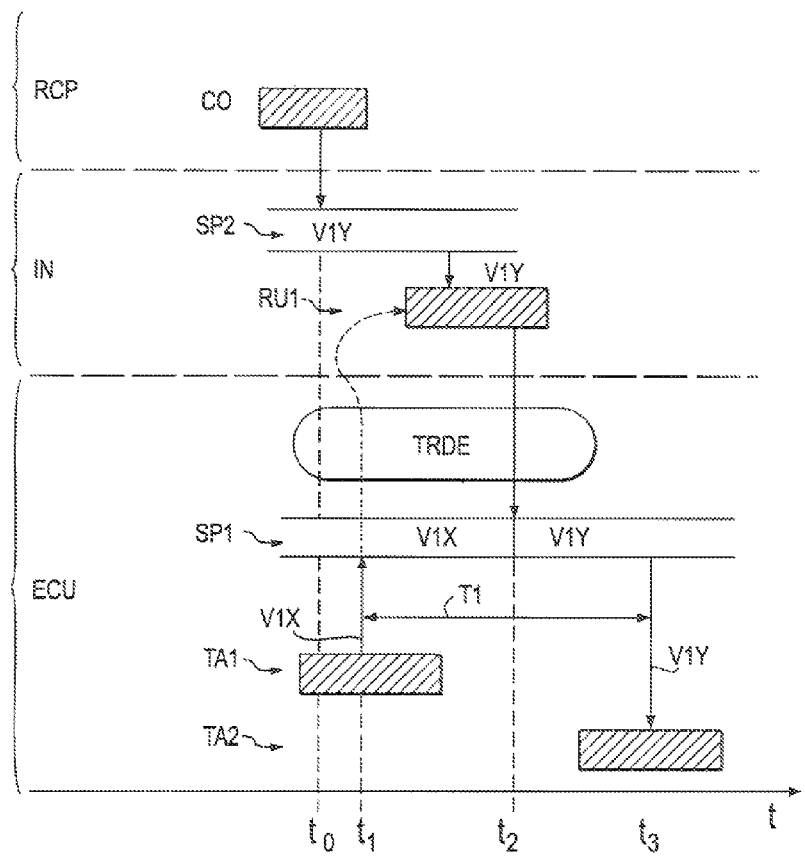
FIG. 4 a schematic representation of a time sequence for a change in data upon making the second value available using a remote control device before the first value is read, according to one embodiment.

In FIG. 4, a first embodiment is depicted for a possible time sequence of operations in the memory area. In the following, only the differences are presented in connection with the drawing data from FIG. 2 and in connection with the arrangements explained from FIG. 3. Within the remote control device RCP, the second value V1Y is filed using the control routine CO in the second memory SP2 for a fourth timepoint T4. Here, the fourth timepoint T4 is still ahead of the first timepoint T1. An advantage of the sequence is that with very fast read-write access to the first memory SP1, if the second value V1Y is detected even before the timepoint T1 at which the write access in the first memory SP1 is detected by the debug interface TRDE, the second value V1Y is ready for writing into the first memory SP1. Thus, no delay results when executing the tasks TA1 and TA2 to be processed using the operating mechanism.

Figure 5:
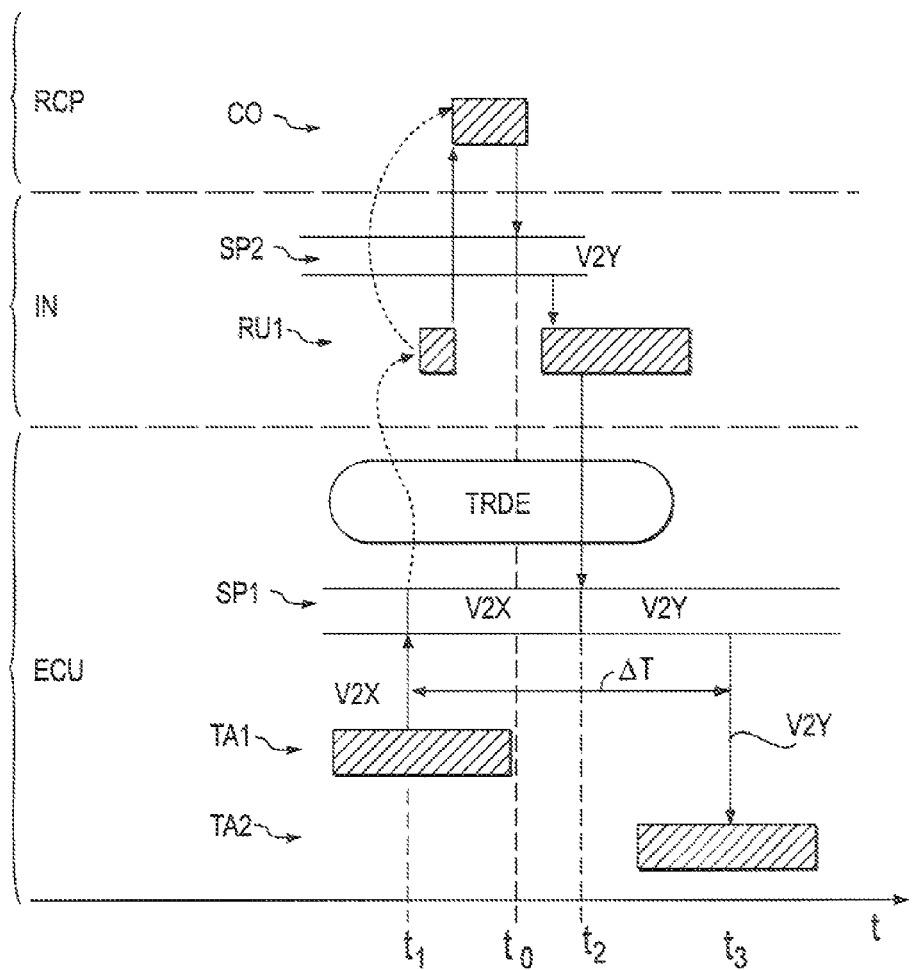
FIG. 5 a schematic representation of a time sequence for a change in data using the manipulation unit, according to one embodiment.

In FIG. 5, a further embodiment is depicted for a possible time sequence of operations in the memory area. In the following, only the differences are presented for the arrangements explained in connection with the drawing data for FIG. 4. In the remote control device RCP, the second value V1Y is filed using the control routine CO in the second memory SP2 for a fourth timepoint T4. Here, the timepoint T4 comes after the first timepoint T1 but ahead of the timepoint T2. An advantage of the embodiment is that with the second value V1Y as a function of the first value V1X, the first value V1X is made available by the processing routine RU1 of the remote control unit RCP, in order to preferably make a calculation in the remote control device RCP. In particular, if the remote control device RCP is provided with a essentially increased computation performance compared to the manipulation unit IN and/or the operating mechanism ECU, complex algorithms can also be processed using the remote control device RCP and the second value V1Y can be calculated more quickly than when the second value V1Y is computed in the manipulation unit IN or by the operating mechanism ECU. In the time between the triggering of the control routine CO using the processing routine RU1 and the second value V1Y being made available, the execution of the processing routine RU1 can be interrupted or placed in standby until, at the latest, the timepoint T2 passes, at which the second value V1Y is filed in the first memory SP1.

What is claimed is:

1. A computer-implemented method comprising:
controlling an operating mechanism using a manipulation unit, wherein the operating mechanism includes at least one microcontroller, at least one memory with a plurality of memory cells, and at least one debug interface, and wherein the debug interface includes a monitoring functionality for monitoring memory content;
detecting a first timepoint of the operating mechanism using the debug interface;
writing a first value into a first memory cell of the first memory;
transmitting, by the debug interface, information comprising the first timepoint to the manipulation unit, wherein a trigger timepoint results for a processing routine using the manipulation unit; and
writing a second value by the manipulation unit using the debug interface at a second timepoint into the first memory cell of the first memory before the first memory cell of the first memory is read by the operating mechanism at a third timepoint.

2. The computer-implemented method according to claim 1, further comprising testing the manipulation unit to determine whether the second timepoint is ahead of the third timepoint and a pre-set value is issued depending on results of the testing.

3. The computer-implemented method according to claim 2, further comprising writing the second value into a first memory cell of a second memory at a fourth timepoint; and reading the second value by the manipulation unit using the processing routine out of the first memory cell of the second memory.

4. The computer-implemented method according to claim 1, further comprising determining by the operating mechanism, a time period for the operating mechanism to write the first value into the first memory cell and to read the first memory cell.

5. The computer-implemented method according to claim 4, wherein determining the time period comprises analyzing the program code for the operating mechanism.

6. The computer-implemented method according to claim 5, wherein analyzing the program code is done without using the operating mechanism.

7. The computer-implemented method according to claim 6, further comprising distributing by the manipulation unit using the size of the time intervals of the read-write access occurring in the operating mechanism, the memory cells of the operating mechanism.

8. The computer-implemented method according to claim 6, further comprising writing the second value into a first memory cell of a second memory at a fourth timepoint; and reading the second value by the manipulation unit using the processing routine out of the first memory cell of the second memory.

9. The computer-implemented method according to claim 5, further comprising writing the second value into a first memory cell of a second memory at a fourth timepoint; and reading the second value by the manipulation unit using the processing routine out of the first memory cell of the second memory.

10. The computer-implemented method according to claim 5, further comprising distributing by the manipulation unit using the size of the time intervals of the read-write access occurring in the operating mechanism, the memory cells of the operating mechanism.

11. The computer-implemented method according to claim 4, further comprising writing the second value into a first memory cell of a second memory at a fourth timepoint; and reading the second value by the manipulation unit using the processing routine out of the first memory cell of the second memory.

12. The computer-implemented method according to claim 4, further comprising determining by the manipulation unit using the monitoring functionality of the debug interface, the time period needed by the operating mechanism.

13. The computer-implemented method according to claim 12, further comprising distributing by the manipulation unit using the size of the time intervals of the read-write access occurring in the operating mechanism, the memory cells of the operating mechanism.

14. The computer-implemented method according to claim 12, further comprising further comprising writing the second value into a first memory cell of a second memory at a fourth timepoint; and reading the second value by the manipulation unit using the processing routine out of the first memory cell of the second memory.

15. The computer-implemented method according to claim 4, further comprising distributing by the manipulation unit using the size of the time intervals of the read-write access occurring in the operating mechanism, the memory cells of the operating mechanism.

16. The computer-implemented method according to claim 15, further comprising writing the second value into a first memory cell of a second memory at a fourth timepoint; and reading the second value by the manipulation unit using the processing routine out of the first memory cell of the second memory.

17. The computer-implemented method according to claim 1, further comprising writing the second value into a first memory cell of a second memory at a fourth timepoint; and reading the second value by the manipulation unit using the processing routine out of the first memory cell of the second memory.

18. The computer-implemented method according to claim 17, wherein the fourth timepoint is ahead of the second timepoint.

19. The computer-implemented method according to claim 17 wherein the fourth timepoint is ahead of the first timepoint.

20. The computer-implemented method according to claim 17, further comprising writing using a remote control device, the second value into the first memory cell of the second memory.

21. A system, comprising:
an operating mechanism including
at least one microcontroller,
at least one memory,
at least one debug interface, wherein the debug interface presents a monitoring functionality for monitoring memory content, wherein the debug interface detects a first timepoint written at a first memory cell of the first memory; and
a manipulation unit, wherein the manipulation unit runs a processing routine using the timepoint transmitted and determines a second value using the processing routine;
wherein the debug interface transmits a first value comprising the first timepoint to a manipulation unit; and
wherein the debug interface writes the second value at a second timepoint in the first memory cell of the first memory before the first memory cell of the first memory is read by the operating mechanism.

22. The system according to claim 21, wherein a first memory cell of a second memory receives the second value.

23. The system according to claim 22, further comprising a remote control device writing to the first memory cell of a second memory.

* * * * *